(12) United States Patent
Shimizu et al.

(10) Patent No.: US 11,432,468 B2
(45) Date of Patent: Sep. 6, 2022

(54) RECIPROCATING BLADE APPARATUS AND HANDHELD WORKING MACHINE

(71) Applicant: YAMABIKO CORPORATION, Tokyo (JP)

(72) Inventors: Kunio Shimizu, Tokyo (JP); Hisao Kodama, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 159 days.

(21) Appl. No.: 16/912,075

(22) Filed: Jun. 25, 2020

(65) Prior Publication Data
US 2020/0404858 A1    Dec. 31, 2020

(30) Foreign Application Priority Data

Jun. 28, 2019  (JP) .............................. JP2019-121828

(51) Int. Cl.
*A01G 3/053*    (2006.01)
*A01G 3/047*    (2006.01)
*A01G 3/04*     (2006.01)

(52) U.S. Cl.
CPC .......... *A01G 3/053* (2013.01); *A01G 3/0475* (2013.01); *A01G 2003/0461* (2013.01)

(58) Field of Classification Search
CPC .......... A01G 3/04; A01G 3/047; A01G 3/053; A01G 2003/0461; A01G 3/0475; A01D 34/134; A01D 34/14; A01D 34/147
USPC .................................... 30/208–210, 215–222
See application file for complete search history.

(56) References Cited

U.S. PATENT DOCUMENTS

| | | | | |
|---|---|---|---|---|
| 5,426,856 A * | 6/1995 | Aiyama | ................. | A01G 3/053 30/208 |
| 5,987,753 A * | 11/1999 | Nagashima | ............ | A01G 3/053 30/216 |
| 6,263,579 B1 | 7/2001 | Nagashima | | |
| 6,910,276 B2 * | 6/2005 | Huang | ................... | A01G 3/053 30/216 |

(Continued)

FOREIGN PATENT DOCUMENTS

| EP | 2294907 A1 | 3/2011 |
|---|---|---|
| JP | 2016049082 A | 4/2016 |

OTHER PUBLICATIONS

European Search Report corresponding International Application 20182266.5 dated Nov. 17, 2020.

*Primary Examiner* — Jason Daniel Prone
(74) *Attorney, Agent, or Firm* — Bacon & Thomas, PLLC (57) ABSTRACT

A reciprocating blade apparatus includes a pair of reciprocating blades stacked on one another in a thickness direction. Each of the blades includes a base as a flat plate extending in a longitudinal direction, and a plurality of teeth protruding in a direction intersecting the longitudinal direction. A transmission case of the reciprocating blade apparatus also includes a reciprocating member having a joint detachably coupled to the base, the reciprocating member being reciprocably supported in the longitudinal direction. A blade support member is attached to the transmission case and configured to sandwich bases of the pair of reciprocating blades therebetween to allow the pair of reciprocating blades to move in the longitudinal direction. The blade support member supporting the pair of reciprocating blades is detachably attached to the transmission case.

10 Claims, 6 Drawing Sheets

(56) References Cited

U.S. PATENT DOCUMENTS

| | | | | |
|---|---|---|---|---|
| 7,406,770 B2* | 8/2008 | Mace | ............... | A01D 34/14 |
| | | | | 30/216 |
| 7,752,760 B2* | 7/2010 | Baskar | ............... | A01G 3/053 |
| | | | | 30/210 |
| 7,757,405 B2* | 7/2010 | Peterson | ............... | A01G 3/053 |
| | | | | 30/220 |
| 7,788,811 B2* | 9/2010 | Hanada | ............... | A01G 3/053 |
| | | | | 30/216 |
| 8,028,423 B2* | 10/2011 | Matsuo | ............... | A01G 3/053 |
| | | | | 30/220 |
| 8,732,959 B2* | 5/2014 | Lugert | ............... | A01G 3/053 |
| | | | | 30/216 |
| 8,959,780 B2* | 2/2015 | Masalin | ............... | A01G 3/053 |
| | | | | 30/208 |
| 9,603,311 B2* | 3/2017 | Wang | ............... | A01G 3/053 |
| 9,610,700 B2* | 4/2017 | Hittmann | ............... | A01G 3/053 |
| 9,675,011 B2* | 6/2017 | Sergyeyenko | ............... | A01G 3/053 |
| 9,736,991 B2* | 8/2017 | Hanada | ............... | A01G 3/053 |
| 10,321,636 B2* | 6/2019 | Peterson | ............... | A01G 3/053 |
| 10,537,069 B2* | 1/2020 | Wykman | ............... | A01G 3/053 |
| 10,537,983 B2* | 1/2020 | Dyer | ............... | A01G 3/053 |
| 10,631,468 B2* | 4/2020 | Hansson | ............... | A01G 3/053 |
| 2010/0037469 A1* | 2/2010 | Chubb | ............... | A01G 3/053 |
| | | | | 30/216 |
| 2011/0179651 A1* | 7/2011 | Hittmann | ............... | A01G 3/053 |
| | | | | 30/216 |
| 2012/0017447 A1* | 1/2012 | Nie | ............... | A01G 3/053 |
| | | | | 30/228 |
| 2013/0326885 A1* | 12/2013 | Kaupp | ............... | A01G 3/053 |
| | | | | 30/208 |
| 2016/0007542 A1* | 1/2016 | Stones | ............... | A01G 3/053 |
| | | | | 30/216 |
| 2016/0330914 A1* | 11/2016 | Tang | ............... | A01G 3/053 |
| 2019/0357445 A1* | 11/2019 | McCue | ............... | A01G 3/053 |
| 2020/0045889 A1* | 2/2020 | Shimizu | ............... | A01G 3/053 |
| 2020/0404857 A1* | 12/2020 | Shimizu | ............... | A01G 3/047 |
| 2020/0406415 A1* | 12/2020 | Shimizu | ............... | B23Q 11/14 |
| 2021/0015033 A1* | 1/2021 | Johnson | ............... | A01D 34/14 |
| 2021/0029887 A1* | 2/2021 | Shimizu | ............... | A01G 3/053 |

* cited by examiner

RECIPROCATING BLADE APPARATUS AND HANDHELD WORKING MACHINE

CROSS-REFERENCE TO RELATED APPLICATIONS

The present application claims priority from Japanese Patent Application No. 2019-121828 filed on Jun. 28, 2019, and the entire contents of which are hereby incorporated by reference.

BACKGROUND

1. Technical Field

The present invention relates to a reciprocating blade apparatus, and a handheld working machine equipped with the reciprocating blade apparatus.

2. Related Art

As a handheld working machine for cutting or clipping branches and leaves, there has been generally known a hedge trimmer equipped with a reciprocating blade apparatus having reciprocating blades, like a hair clipper. Meanwhile, as a handheld working machine for cutting grass on the ground, there has been generally known a brush cutter equipped with rotary blades or nylon cutters.

The handheld working machine for cutting branches and leaves is required to produce little scattering substances during the work, in order to ensure the safety of the worker and the surrounding of the worker, or to prevent the damage of other people's properties near the working site. The amount of scattering substances produced by the reciprocating blades during the work is less than those of the rotary blade and the nylon cutters which rotate at a high speed. With this advantage of the reciprocating blades, a working machine for cutting grass on the ground has been proposed, for example, in Japanese Unexamined Patent Application Publication No. 2016-49082 (hereinafter JP No. 2016-49082), which includes a reciprocating blade apparatus mounted to the top end of a handheld operating rod.

This reciprocating blade apparatus mounted to the top end of the operating rod includes blades extending in the direction intersecting the longitudinal direction of the operating rod. A drive source such as an engine and a motor is provided at the base end of the operating rod, and a drive force is transmitted to a power train in a transmission case of the reciprocating blade apparatus via a drive shaft provided in the operating rod. The power train in the transmission case converts the rotation of the drive shaft to reciprocating motion to operate the reciprocating blades coupled to the power train.

The reciprocating blade apparatus disclosed in JP No. 2016-49082, or provided for the hedge trimmer needs the maintenance of the blades to repeatedly operate with good sharpness. In particular, if the blades are left dirty due to, for example, the adhesion of resin, the blades get rusty or deteriorate, or the distance between the upper and lower blades increases, and consequently become blunt. Accordingly, in order to maintain the performance of the reciprocating blade apparatus, it is necessary to clean the blades after the work.

In this case, although JP No. 2016-49082 approaches to improve the efficiency of the maintenance of the blades to be replaced, it is necessary to take apart a part of the apparatus to detach the blades, and therefore it takes a lot of work and time for the maintenance of the blades. In addition, JP No. 2016-49082 has a problem that when the blades are attempted to be cleaned without taking apart the apparatus, the water enters a transmission case, and therefore a power train is deteriorated.

Moreover, JP No. 2016-49082 has a different problem that one reciprocating blade apparatus can provide only one cutting width, and therefore it is not possible to select the appropriate cutting width depending on whether the work area is small or large. In order to use the blades with the appropriate cutting width depending on whether the work area is small or large, a plurality of blades and their accessory parts need to be prepared and replaced accordingly. However, JP No. 2016-49082 has to take apart the apparatus to replace the blades and their accessory parts, and therefore it takes a lot of work and time for the replacement. Meanwhile, when the replacement is requested to a dealer and so forth, money should be paid for the replacement, and if the user needs to purchase individual apparatuses for various cutting widths, the cost is increased.

SUMMARY

To solve the above-described problem, it is desirable to provide a reciprocating blade apparatus capable of improving the efficiency of the maintenance of the blades, more specifically, capable of performing brush cutting with various cutting widths with reduced cost and ease of use.

An aspect of the present invention provides a reciprocating blade apparatus including: a pair of reciprocating blades stacked on one another in a thickness direction, each of which includes a base as a flat plate extending in a longitudinal direction, and a plurality of teeth protruding in a direction intersecting the longitudinal direction; a transmission case including a reciprocating member having a joint detachably coupled to the base, the reciprocating member being reciprocably supported in the longitudinal direction; and a blade support member attached to the transmission case and configured to sandwich bases of the pair of reciprocating blades therebetween to allow the pair of reciprocating blades to move in the longitudinal direction. wherein the blade support member supporting the pair of reciprocating blades is detachably attached to the transmission case.

According to the present invention, it is possible to easily detach the blade support member supporting the reciprocating blades from the transmission case to maintain the reciprocating blades, after the reciprocating blade apparatus is used. By this means, it is possible to clean the reciprocating blades separated from the transmission case, and to reduce the workload and the time for the maintenance of the reciprocating blades.

Moreover, when the length of the blades needs to be changed to change the cutting width, it is possible to easily attach a unit of reciprocating blades having a different length and a blade support member to the transmission case. Therefore, it is possible to perform brush cutting with various cutting widths, while reducing the cost and making it easy for the user to use of the reciprocating blade apparatus.

DETAILED DESCRIPTION

Hereinafter, an embodiment of the present invention will be described with reference to the drawings. The same reference numbers in the different drawings indicate the same functional parts, and therefore repeated description for each of the drawings is omitted.

Figure 1:
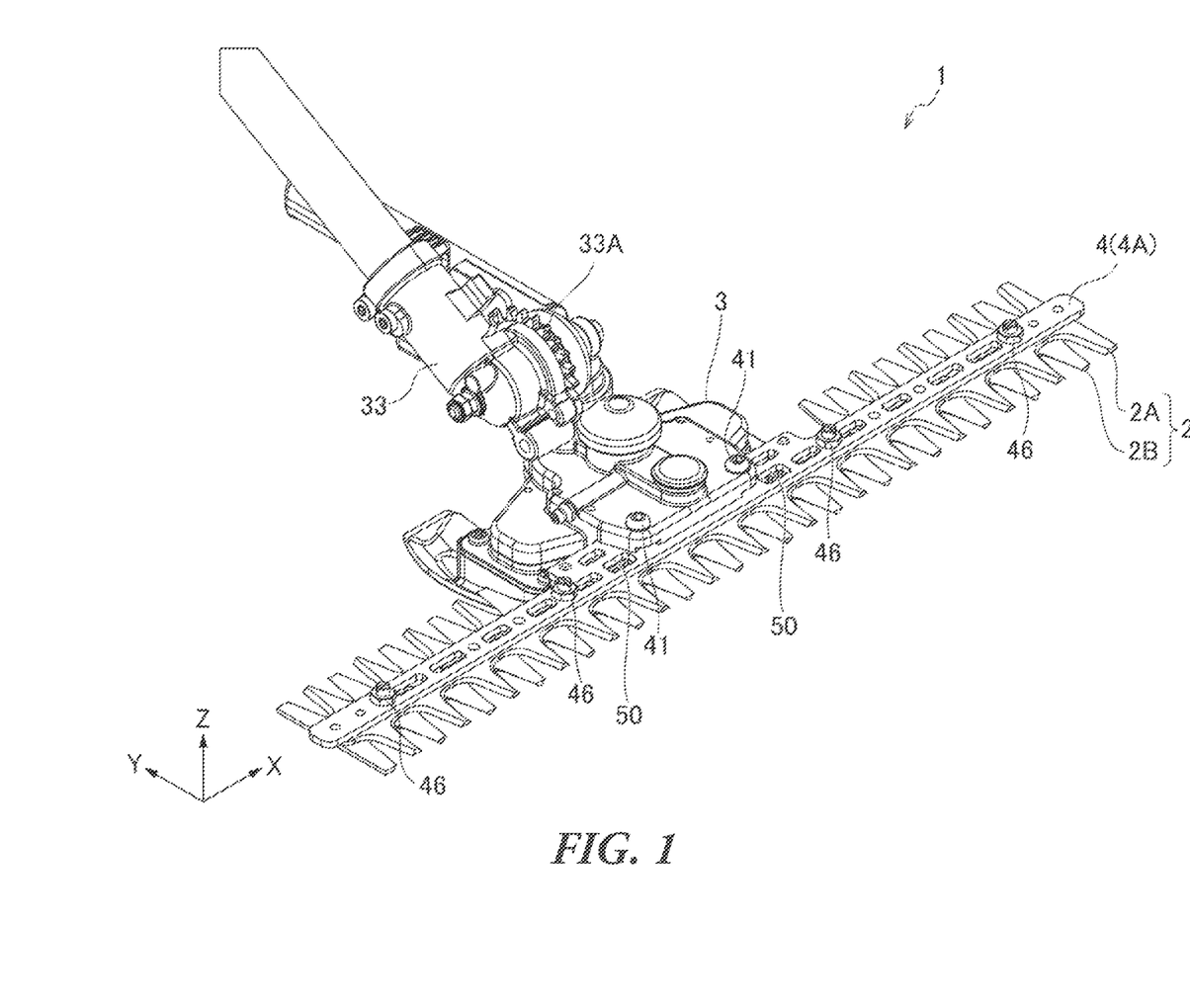
FIG. 1 is a perspective view illustrating the external appearance of a reciprocating blade apparatus according to an embodiment of the present invention.
Figure 2:
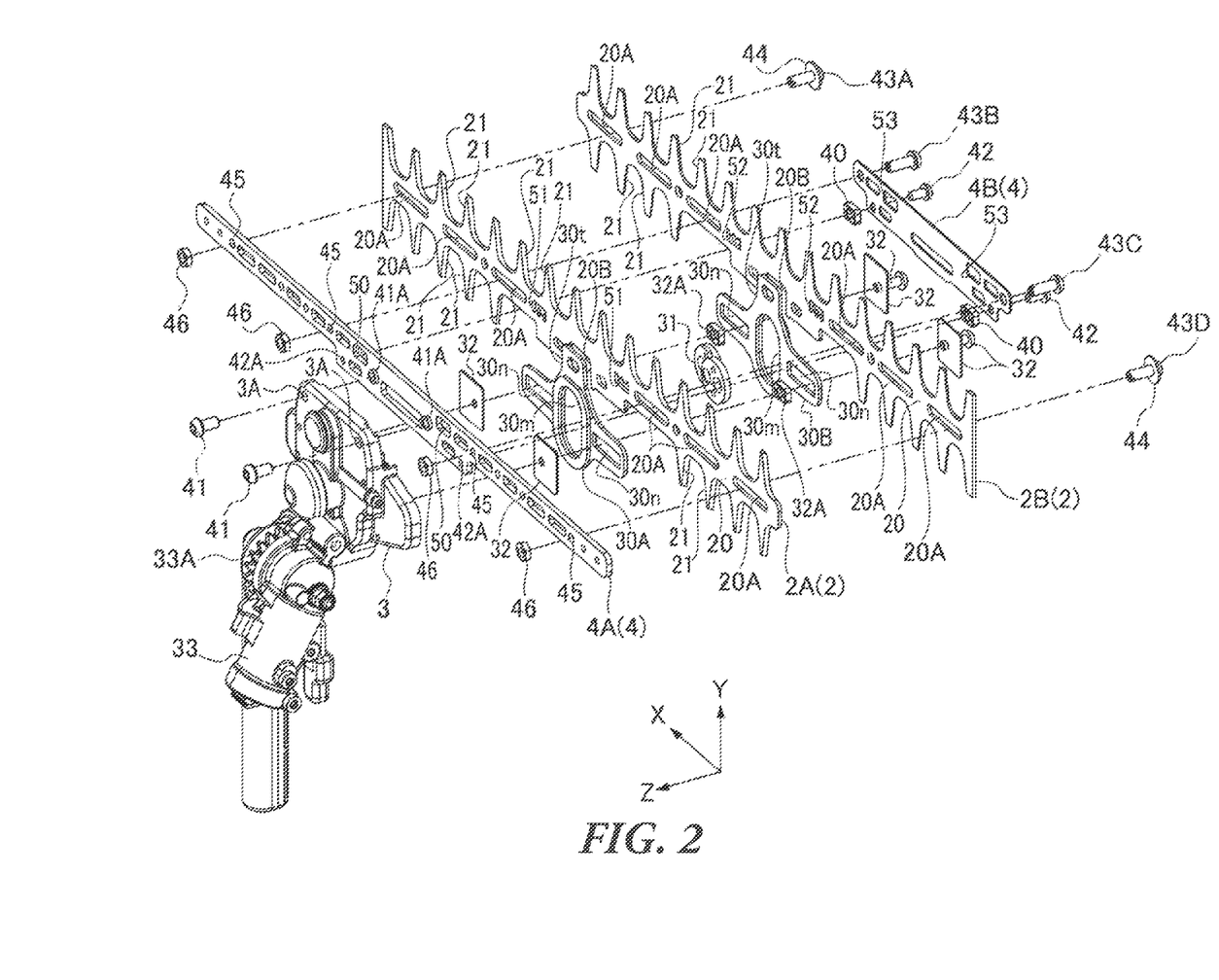
FIG. 2 is an exploded perspective view illustrating the reciprocating blade apparatus according to an embodiment of the present invention.

As illustrated in FIGS. 1 and 2, a reciprocating blade apparatus 1 includes a pair of reciprocating blades 2 (hereinafter referred to as "blade member"), a transmission case 3, and a blade support member 4. The reciprocating blade apparatus 1 is configured to cut and mow plants and so forth by sliding and reciprocating the blade member 2 relative to one another.

The blade member 2 includes two blades 2A and 2B made of metal plates which are stacked in the thickness direction (Z direction in the drawings). Each of the blades 2A and 2B of the blade member 2 includes a base 20 as a flat plate extending in the longitudinal direction (X direction in the drawings) and a plurality of teeth 21 protruding in the direction (Y direction in the drawings) intersecting the longitudinal direction.

The base 20 of each of the blades 2A and 2B is supported by the blade support member 4, and includes a plurality of long holes 20A formed along the longitudinal direction (X direction in the drawings) of the blade member 2. Adjustment screws described later as fastening members penetrate the long holes 20A.

The teeth 21 may be provided in both sides of each of the blades 2A and 2B in Y direction as illustrated, or provided in one side. These teeth 21 are like comb-like blades of a hair clipper. The two blades 2A and 2B slide relative to one another in the longitudinal direction to cut the plants between the teeth 21 of the blades 2A and 2B.

The transmission case 3 includes a power train to reciprocate the blade member 2. The power train is configured to convert the rotation of a drive shaft (not illustrated) to reciprocating motion, and includes reciprocating members 30A and 30B such as connecting rods which are reciprocably supported in the longitudinal direction (X direction in the drawings) of the blade member 2, and a cam 31.

The reciprocating members 30A and 30B include joints 30t to connect to the bases 20 of the blades 2A and 2B, respectively. Each of the joints 30t includes a convex portion protruding in the direction (Y direction in the drawings) orthogonal to the longitudinal direction of the blade member 2. Meanwhile, a concave portion 20B is formed in the base 20 to engage with the convex portion of the joint 30t.

As illustrated in FIG. 2, each of the reciprocating members 30A and 30B includes a fitting hole 30m in which the cam 31 is fitted, and guide holes 30n in which guide pieces 32A of the support members 32 are fitted to support the reciprocating members 30A and 30B by the transmission case 3. The guide holes 30n are provided on the right and left sides of the fitting hole 30m along X direction in FIG. 2.

The blade support member 4 is attached to the transmission case 3, and sandwiches the bases 20 of the pair of blades 2A and 2B therebetween to allow the blade member 2 to move in the longitudinal direction (X direction in the drawings). As illustrated in FIG. 2, the blade support member 4 includes a pair of support plates (upper support plate 4A and lower support plate 4B) extending in the longitudinal direction (X direction) of the blade member 2.

The upper support plate 4A and the lower support plate 4B of the blade support member 4 are fastened via spacers 40 to make a space to accommodate the blades member 2. The upper support plate 4A and the lower support plate 4B are individually attached to the transmission case 3 while keeping the space. The blade member 2 is accommodated in the space and detachably attached to the blade support member 4.

Hereinafter, the configuration where the blade member 2 is fastened and supported by the blade support member 4 will be described in detail with reference to FIG. 2. First, attachment screws 41 are screwed into screw holes 41A of the upper support plate 4A via holes 3A of the transmission case 3 to independently attach the upper support plate 4A of the blade support member 4 to the transmission case 3. Meanwhile, the upper support plate 4A and the lower support plate 4B are fastened by fastening screws 42 at fastening points 42A without interfering with the blade member 2. The fastening screws 42 penetrate the holes of the lower support plate 4B and the spacers 40, and are screwed into the fastening points 42A of the upper support plate 4A. By this means, the upper support plate 4A and the lower support plate 4B are fastened while keeping the space for the thickness of the spacers 40, and attached to the transmission case 3.

The pair of blades 2A and 2B sandwiched between the upper support plate 4A and the lower support plate 4B is reciprocably supported by the blade support member 4 with the adjustment screws 43A, 43B, 43C and 43D at points different from the fastening points 42A. Here, the two adjustment screws 43A and 43D of the four adjustment screws 43A, 43B, 43C and 43D are inserted into washers 44 and screwed into screw holes 45 of the upper support plate 4A via the long holes 20A of the blade member 2, and fixed by fixing nuts 46. In addition, the other two adjustment screws 43B and 43C are inserted into the holes of the lower support plate 4B, and screwed into the screw holes 45 of the upper support plate 4A via the long holes 20A of the blade member 2, and fixed by the fixing nuts 46.

Figure 3A:
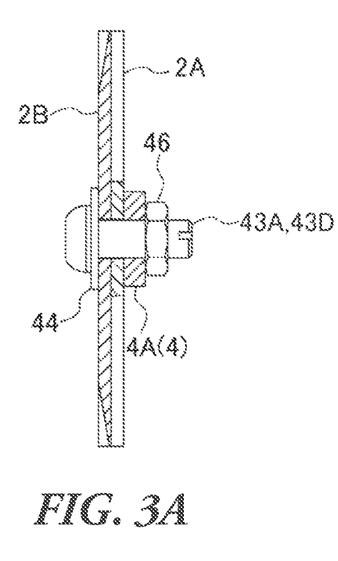
FIG. 3A is a cross-sectional view illustrating adjustment screws 43A and 43D.
Figure 3B:
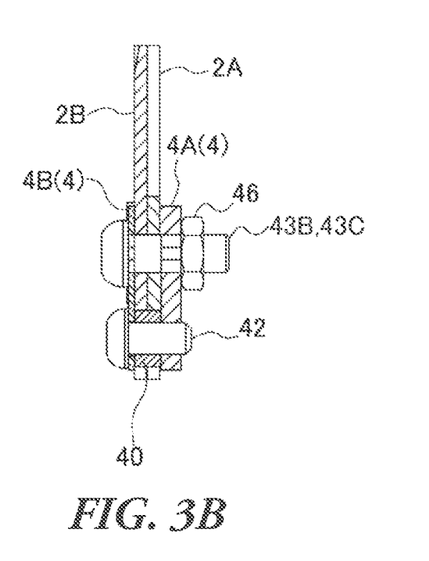
FIG. 3B is a cross-sectional view illustrating adjustment screws 43B and 43C.

In this case, as illustrated in FIG. 3A, the distance between the washer 44 and the upper support plate 4A is adjusted by the adjustment screws 43A and 43D, and therefore it is possible to adjust the distance between the two blades 2A and 2B sandwiched between the washer 44 and the upper support plate 4A. In addition, as illustrated in FIG. 3B, the distance between the upper support plate 4A and the lower support plate 4B is adjusted by the adjustment screws 43B and 43D, and therefore it is possible to adjust the distance between the two blades 2A and 2B sandwiched between the upper support plate 4A and the lower support plate 4B.

The blade member 2 is supported by the upper support plate 4A with the adjustment screws 43A to 43D at the positions different from those of the screw holes 41A in which the attachment screws 41 are inserted to attach the upper support plate 4A to the transmission case 3. By this means, it is possible to detach the blade member 2 simply by removing the adjustment screws 43A to 43D while the blade support member 4 remains attached to the transmission case 3.

Although there are the spacers 40 between the upper support plate 4A and the lower support plate 4B, the adjustment screws 43B and 43C are provided at positions different from the fastening points 42A at which the upper support plate 4A and the lower support plate 4B are fastened via the spacers 40. Therefore, it is possible to adjust the distance between the upper support plate 4A and the lower support plate 4B by fastening the adjustment screws 43B and 43C to elastically deform the upper support plate 4A and the lower support plate 4B.

The adjustment of the distance between the two blades 2A and 2B is important to maintain the sharpness of the blade member 2. The ware of the bases 20 and the upper and lower support plates 4A and 4B as well as the teeth 21 due to repeated use increases the distance between the blades 2A and 2B, and therefore loses the sharpness. To recover the sharpness, maintenance needs to adequately adjust the distance between the blades 2A and 2B by the adjustment screws 43A to 43D.

Figure 4:
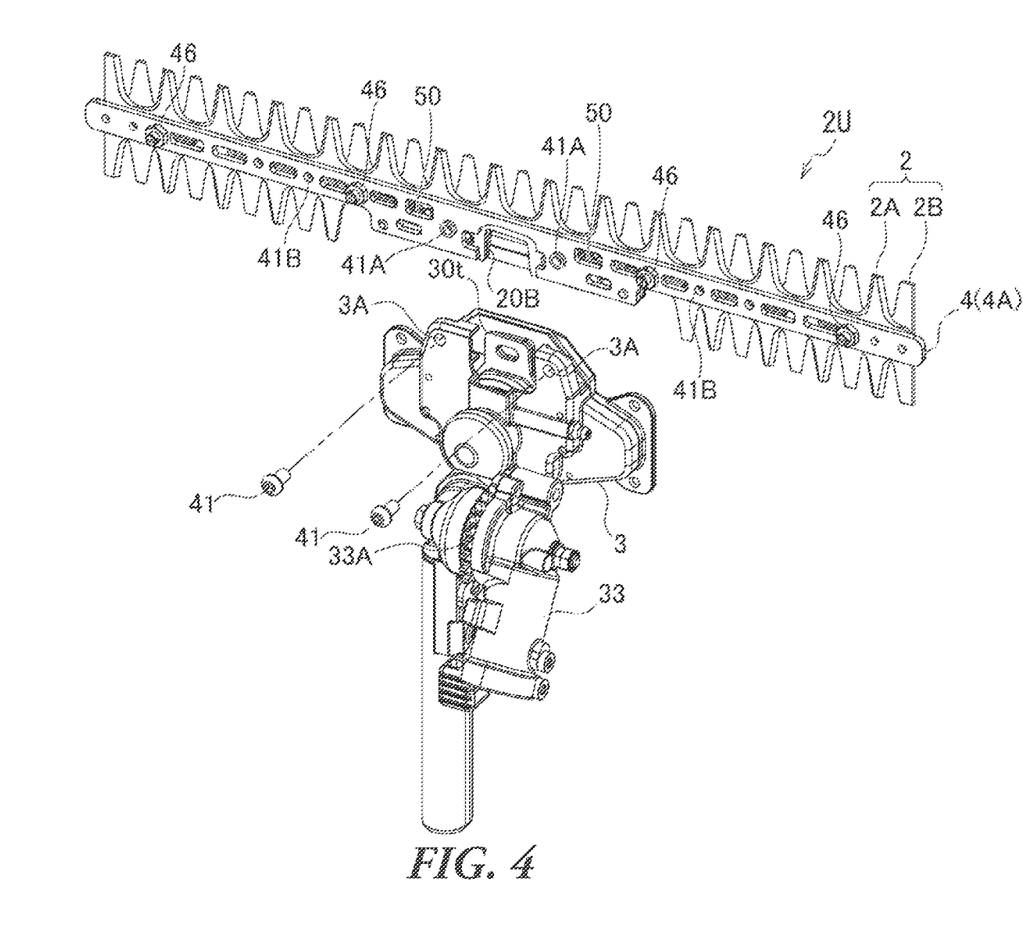
FIG. 4 illustrates detachment of a blade support member from a transmission case.

As illustrated in FIG. 4, the blade support member 4 supporting the blade member 2 is detachably attached to the transmission case 3. The blade support member 4 can be detached from the transmission case 3 simply by removing the attachment screws 41. By this means, the blade member 2 and the blade support member 4 which are unitized with the fastening screws 42 and the adjustment screws 43A to 43D can be detached from the transmission case 3. Hereinafter, the unitized blade member 2 and blade support member 4 may be referred to as "blade assembly 2U."

In this case, the attachment screws 41 and the adjustment screws 43A to 43D do not interfere with each other, and therefore it is possible to adjust the distance between the blades 2A and 2B with the adjustment screws 43A to 43D while the blade assembly 2U is detached from the transmission case 3 by removing the attachment screws 41. In addition, after the maintenance such as cleaning of the blade assembly 2U detached from the transmission case 3, it is possible to attach the blade assembly 2U to the transmission case 3 without changing the adjustment state of the adjustment screw 43.

Figure 5:
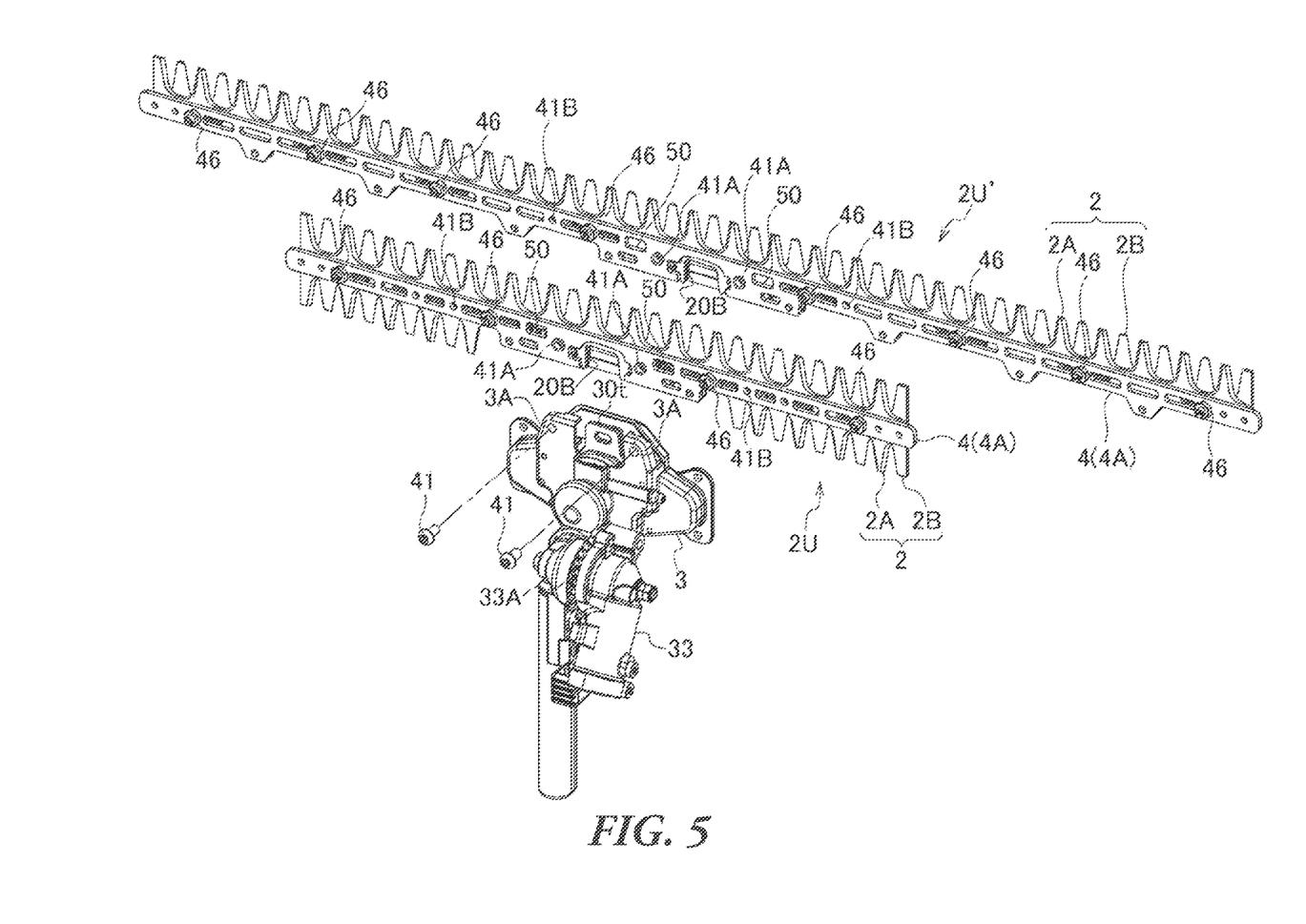
FIG. 5 illustrates replacement of a blade assembly.

Then, as illustrated in FIG. 5, a blade assembly 2U' including the blade member 2 having a different length and the blade support member 4 is prepared for the brush cutting with a different cutting width, and replaced with the blade assembly 2U and attached to the transmission case 3. The blade assembly 2U' includes screw holes 41A that allow the blade assembly 2U' to be attached to the transmission case 3 with the attachment screws 41. By this means, it is possible to easily replace the blade assembly 2U with the blade assembly 2U' having a different cutting width by removing and inserting the attachment screws 41.

If the blade member 2 is displaced after the blade assembly 2U is detached from the transmission case 3, the joints 30t of the reciprocating members 30A and 30B cannot be aligned with the concave portions 20B of the blades 2A and 2B, respectively. Therefore, it is not possible to smoothly engage the joints 30t with the concave portions 20B when the blade assembly 2U is attached to the transmission case 3. To solve this problem, the blade support member 4 includes a holding member to hold the position of the blade member 2 supported by the blade support member 4 when the blade support member 4 is detached from the transmission case 3.

To be more specific, when the attachment screws 41 are removed from the holes 3A of the transmission case 3, these attachment screws 41 are screwed into screw holes 41B of the upper support plate 4A of the blade support member 4 to fix the blade member 2 to the upper support plate 4A of the blade support member 4. As these holding members, some different screws screwed into the screw holes 41B to fix the blade member 2 to the blade support member 4 may be prepared. However, when the attachment screws 41 are used as the holding members, it is possible to eliminate the disadvantage that the removed attachment screws 41 are lost.

When the blade assembly 2U is detached from the transmission case 3, the joint 30t of the reciprocating member 30A engaged with the concave portion 20B of the blade 2A overlaps the joint 30t of the reciprocating member 30B engaged with the concave portion 20B of the blade 2B. By this means, it makes it easy not only to detach the blade assembly 2U from the transmission case 3 but also to attach the blade assembly 2U to the transmission case 3. However, when the blade member 2 is stopped while the blades 2A and 2B reciprocate, the concave portion 20B of the blade 2A and the concave portion 20B of the blade 2B usually are not aligned with one another, and therefore the joints 30t are not aligned with one another.

Therefore, alignment holes 50 of the upper support plate 4A, alignment holes 51 of the blade 2A, alignment holes 52 of the blade 2B, and alignment holes 53 of the lower support plate 4B are provided to align the blades 2A and 2B with one another when the blade member 2 is stopped. After the blade member 2 is stopped, the blades 2A and 2B can be aligned with one another by inserting a tool such as a flat-blade screwdriver into the alignment holes 50 to 53, it is possible to align the concave portions 20B of the blades 2A and 2B with one another before the blade assembly 2U is detached from the transmission case 3. By this means, it is possible to overlap the joints 30t engaged with the concave portions 20B with one other.

While this overlap is maintained, the attachment screws 41 as the holding members are screwed into the screw holes 41B, and then inserted into through-holes 22 of the blades 2A and 2B. By this means, it is possible to maintain the alignment of the concave portions 2B of the blades 2A and 2B. In this way, the blade member 2 is held after the alignment of the blades 2A and 2B. By this means, it makes it easy to detach and attach the blade assembly 2U from and to the transmission case 3.

As described above, the blade member 2 is held by the blade support member 4. By this means, it is possible to readily and smoothly engage the concave portions 20B with the joints 30t of the reciprocating members 30A and 30B to attach the blade assembly 2U to the transmission case 3 after the maintenance such as cleaning of the blade assembly 2U detached from the transmission case 3.

The reciprocating blade apparatus 1 allows the maintenance of the blades member 2 after being used, by easily detaching the blade support member 4 supporting the blade member 2 from the transmission case 3. By this means, it is possible to clean the blade member 2 separated from the transmission case 3 while the water does not enter the transmission case 3. In addition, it is possible to detach and attach the blade assembly 2U simply by inserting and removing the attachment screws 41, and therefore to reduce the workload and the time for the maintenance and the replacement of the blade member 2.

Moreover, in order to change the length of the blade member 2 to perform brush cutting with a different cutting width, a plurality of blade assemblies 2U including the blade members 2 having different lengths are prepared to allow the user to easily replace the blade assembly 2U. Therefore, it is possible to perform brush cutting with various cutting widths, while reducing the cost and making it easy for the user to use of the reciprocating blade apparatus.

Figure 6:
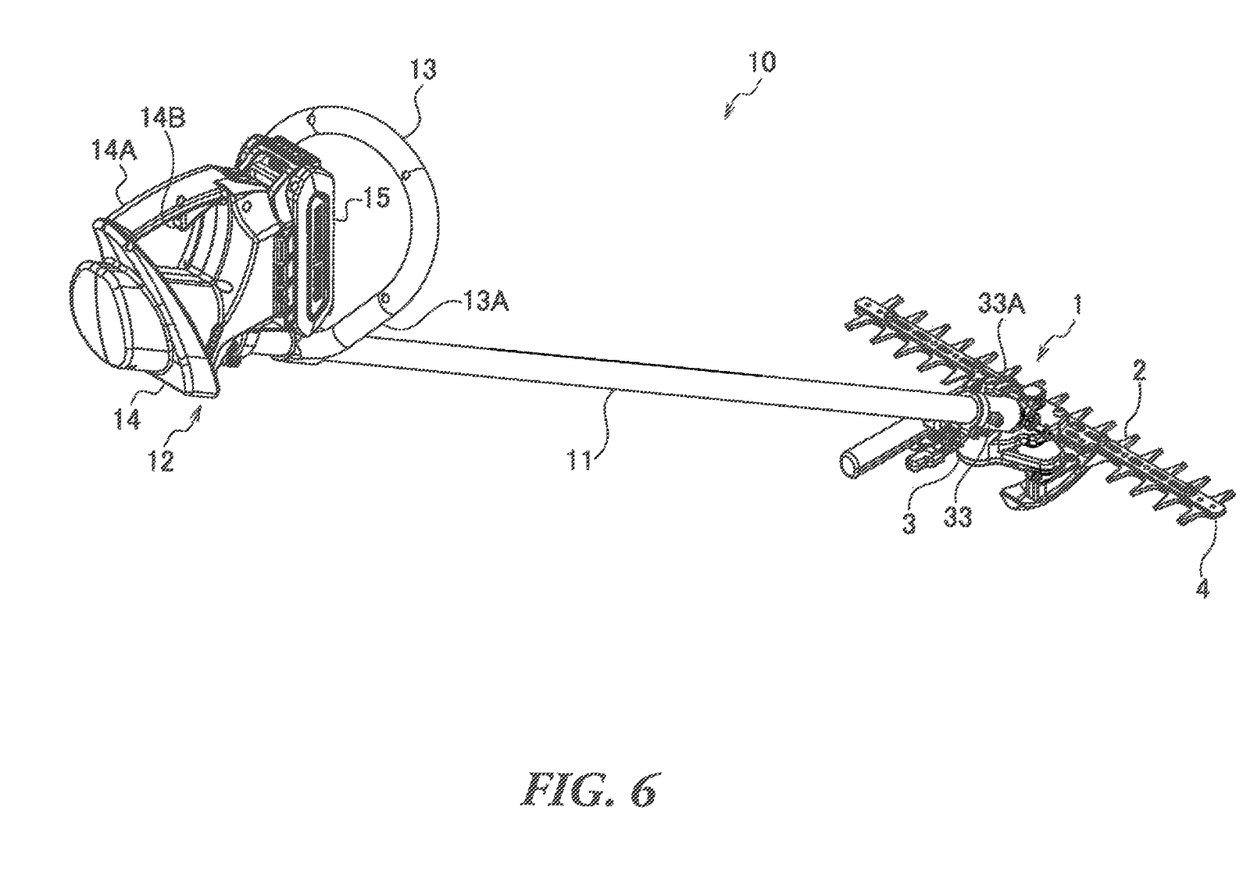
FIG. 6 illustrates a handheld working machine equipped with the reciprocating blade apparatus.

FIG. 6 illustrates an example of handheld working machine including the reciprocating blade apparatus 1. As illustrated in FIG. 5, a handheld working machine 10 includes an operating rod 11, and the top end of the operating rod 11 is mounted to an operating rod mount 33 of the transmission case 3. The operating rod mount 33 is mounted to the transmission case 3 via an angle adjustment mechanism 33A. The angle adjustment mechanism 33A can adjust the rising angle of the operating rod 11 from the working surface of the blade member 2.

A drive shaft (not illustrated) configured to transmit a drive force to the power train is provided in the operating rod 11. In addition, a drive unit 12 configured to drive the drive shaft is provided at the base end of the operating rod 11, and an operating handle 13 is provided in the base end side of the operating rod 11. The operating handle 13 includes a grip 13A above the operating rod 11.

The drive unit 12 is configured to drive the reciprocating blade apparatus 1 via the drive shaft in the operating rod 11, and includes a housing 14 to accommodate a motor disposed approximately coaxially with the operating rod 11. A rear handle 14A including an operating switch 14B configured to turn on and off the reciprocating blade apparatus 1 is provided in the housing 14. A buttery unit 15 configured to supply electric power to the motor in the housing 14 is externally attached to the housing 14.

This handheld working machine 10 is an electrically-operated brush cutter equipped with the reciprocating blade apparatus 1. The longitudinal direction of the blade member 2 intersects the longitudinal direction of the operating rod 11, and therefore the reciprocating blade apparatus 1 is provided at the top end of the operating rod 11 to forma T-shape. This handheld working machine 10 performs brush cutting by driving the reciprocating blade apparatus 1 to move the reciprocating blade apparatus 1 along the ground while the worker holds the operating handle 13 and the rear handle 14A of the housing 14 by the hands to keep a predetermined rising angle of the operating rod 11 from the ground.

With this handheld working machine 10, the width of the blade member 2 of the reciprocating blade apparatus 1 is the effective width, and therefore the worker simply pushes the operating rod 11 without shaking the operating rod 11 from side to side, and consequently it is possible to do the brush cutting with the effective width. Therefore, it is possible to perform the brush cutting by speedily moving the reciprocating blade apparatus 1 forward, and consequently to improve the efficiency of the brush cutting. Moreover, the reciprocating blades are used, and therefore it is possible to reduce the scattering substances during the brush cutting. By this means, it is possible to ensure the safety of the worker and the surrounding of the worker, and prevent the damage of other people's properties near the working site during the brush cutting.

Moreover, with the handheld working machine 10, it is possible to reduce the workload and the working time to attach, detach and replace the blade assembly 20, and consequently to improve the efficiency of the maintenance for repeated works.

As described above, the embodiments of the present invention have been described in detail with reference to the drawings. However, the specific configuration is not limited to the embodiments, and the design can be changed without departing from the scope of the present invention. In addition, the above-described embodiments can be combined by utilizing each other's technology as long as there is no particular contradiction or problem in the purpose and configuration.

The invention claimed is:

1. A reciprocating blade apparatus comprising:
   a pair of reciprocating blades stacked on one another in a thickness direction, each of the blades including:
   bases shaped like a flat plate extending in a longitudinal direction; and
   a plurality of teeth protruding in a direction intersecting the longitudinal direction;
   a transmission case including a pair of reciprocating members, each of the reciprocating members having a joint detachably coupled to each of the bases, the reciprocating members being supported by the transmission case in a state where the reciprocating members are able to reciprocate in the longitudinal direction; and
   a pair of blade support members configured to be detachably attached to the transmission case and to sandwich the bases of the pair of reciprocating blades therebetween to allow the pair of reciprocating blades to move in the longitudinal direction,
   wherein the blade support members sandwiching the bases of the reciprocating blades are detachable from the transmission case while the joints of the reciprocating members are held by the transmission case.

2. The reciprocating blade apparatus according to claim 1, wherein the blade support member includes a keeping member configured to keep a position of the pair reciprocating blades with respect to the blade support member supporting the blades when the blade support member is detached from the transmission case.

3. The reciprocating blade apparatus according to claim 2, wherein the keeping member is used as an attachment member configured to attach the blade support members to the transmission case when the blade support members are attached to the transmission case.

4. The reciprocating blade apparatus according to claim 1, wherein:
   each of the joints includes a convex portion protruding in a direction intersecting the longitudinal direction; and
   each of the bases includes a concave portion to engage with the convex portion of the joint.

5. The reciprocating blade apparatus according to claim 4, wherein the concave portion is formed near a center of each of the bases in the longitudinal direction.

6. A handheld working machine including a reciprocating blade apparatus, the reciprocating blade apparatus including:
   a pair of reciprocating blades stacked on one another in a thickness direction, each of the blades including:
   a base shaped like a flat plate extending in a longitudinal direction; and
   a plurality of teeth protruding in a direction intersecting the longitudinal direction;
   a transmission case including a pair of reciprocating members, each of the reciprocating members having a joint detachably coupled to each of the bases, the reciprocating members being supported by the transmission case in a state where the reciprocating members are able to reciprocate in the longitudinal direction; and a pair of blade support members configured to be detachably attached to the transmission case and to sandwich the bases of the pair of reciprocating blades therebetween to allow the pair of reciprocating blades to move in the longitudinal direction, wherein the blade support members sandwiching the bases of the reciprocating blades are detachable from the transmission case while the joints of the reciprocating members are held by the transmission case, the handheld working machine comprising:

an operating rod having a first end to which the transmission case is mounted; and a drive unit provided at a second end of the operating rod and configured to drive the pair of reciprocating blades, wherein the longitudinal direction of the pair of reciprocating blades intersects a longitudinal direction of the operating rod.

7. The reciprocating blade apparatus according to claim 6, wherein the blade support member includes a keeping member configured to keep a position of the pair reciprocating blades with respect to the blade support member supporting the blades when the blade support member is detached from the transmission case.

8. The reciprocating blade apparatus according to claim 7, wherein the keeping member is used as an attachment member configured to attach the blade support members to the transmission case when the blade support members are attached to the transmission case.

9. The handheld working machine according to claim 6, wherein:

each of the joints includes a convex portion protruding in a direction intersecting the longitudinal direction; and each of the bases includes a concave portion to engage with the convex portion of the joint.

10. The handheld working machine according to claim 9, wherein the concave portion is formed near a center of each of the bases in the longitudinal direction.

\* \* \* \* \*